(12) United States Patent  
Jonuscheit

(10) Patent No.: US 11,745,725 B2
(45) Date of Patent: Sep. 5, 2023

(54) METHOD FOR OPERATING A HYBRID DRIVE ASSEMBLY FOR A MOTOR VEHICLE AND CORRESPONDING HYBRID DRIVE ASSEMBLY

(71) Applicant: AUDI AG, Ingolstadt (DE)

(72) Inventor: Michael Jonuscheit, Nuremberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/783,779

(22) PCT Filed: Feb. 18, 2021

(86) PCT No.: PCT/EP2021/053930
§ 371 (c)(1),
(2) Date: Jun. 9, 2022

(87) PCT Pub. No.: WO2021/175597
PCT Pub. Date: Sep. 10, 2021

(65) Prior Publication Data
US 2023/0011692 A1    Jan. 12, 2023

(30) Foreign Application Priority Data

Mar. 3, 2020  (DE) ...................... 10 2020 105 592.7

(51) Int. Cl.
*B60W 20/50* (2016.01)
*B60W 10/02* (2006.01)
(Continued)

(52) U.S. Cl.
CPC ............ *B60W 20/50* (2013.01); *B60W 10/02* (2013.01); *B60W 10/06* (2013.01); *B60W 10/08* (2013.01);
(Continued)

(58) Field of Classification Search
CPC ...... B60W 20/50; B60W 10/02; B60W 10/06; B60W 10/08; B60W 30/186;
(Continued)

(56) References Cited

U.S. PATENT DOCUMENTS 9,238,458 B2 *   1/2016   Okubo ................... F02N 11/08
2014/0129066 A1   5/2014   Kaisha
(Continued)

FOREIGN PATENT DOCUMENTS

DE            3540719 A1   6/1986
DE      102014204766 A1   10/2014
(Continued)

OTHER PUBLICATIONS

German Examination Report dated Jan. 7, 2021, in connection with corresponding German Application No. 10 2020 105 592.7 (12 pp., including machine-generated English translation).

(Continued)

*Primary Examiner* — Roger L Pang
(74) *Attorney, Agent, or Firm* — Maier & Maier, PLLC

(57) ABSTRACT

A method for operating a hybrid drive assembly for a motor vehicle, which has an internal combustion engine and an electric engine. A separating clutch arranged in drive terms between the internal combustion engine and the electric engine is set to a target clutch torque by at least partially engaging during an attempt to start the internal combustion engine. An actual clutch torque actually transmitted via the separating clutch and a speed of the internal combustion engine are determined during the attempt to start, and if a characteristic value dependent on the actual clutch torque (Continued)

exceeds a threshold value and if an integral of the speed over time continuously falls below a limit value during the attempt to start, the attempt to start is aborted.

18 Claims, 1 Drawing Sheet

(51) Int. Cl.
  *B60W 10/06* (2006.01)
  *B60W 10/08* (2006.01)
  *B60W 30/186* (2012.01)
  *B60W 30/192* (2012.01)
(52) U.S. Cl.
  CPC ........ *B60W 30/186* (2013.01); *B60W 30/192* (2013.01); *B60W 2510/0275* (2013.01); *B60W 2510/0291* (2013.01); *B60W 2510/0638* (2013.01); *B60W 2710/027* (2013.01)
(58) Field of Classification Search
  CPC ....... B60W 30/192; B60W 2510/0275; B60W 2510/0283; B60W 2510/0638
  USPC .................................................. 477/5; 701/68
  See application file for complete search history.

(56) References Cited

U.S. PATENT DOCUMENTS

| 2017/0120896 A1* | 5/2017 | Thompson | B60K 6/48 |
| 2022/0213856 A1* | 7/2022 | Baxendale | F02N 15/022 |
| 2022/0309845 A1* | 9/2022 | Shui | G07C 5/0816 |

FOREIGN PATENT DOCUMENTS

| EP | 2689157 B1 | 11/2014 |
| EP | 2232050 B1 | 6/2019 |
| JP | 201083426 A | 4/2010 |
| JP | 201574299 A | 4/2015 |

OTHER PUBLICATIONS

International Search Report on with English translation dated Apr. 22, 2021, in corresponding International Application No. PCT/EP2021/053930; 6 pages.

International Preliminary Report on Patentability with English translation dated Sep. 6, 2022, in corresponding International Application No. PCT/EP2021/053930; 15 pages.

* cited by examiner

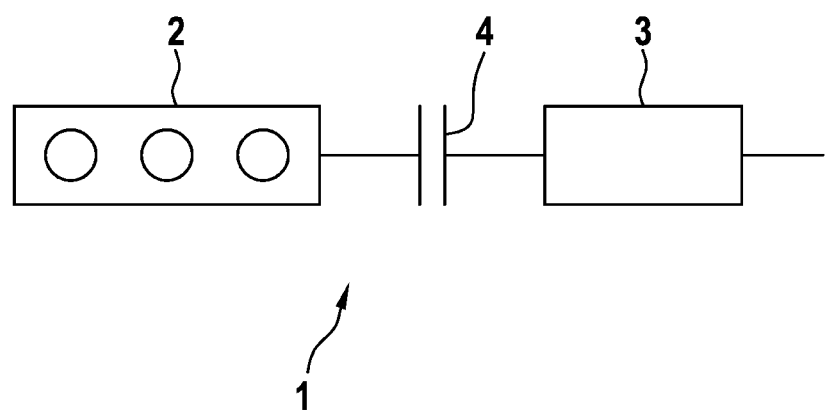

METHOD FOR OPERATING A HYBRID DRIVE ASSEMBLY FOR A MOTOR VEHICLE AND CORRESPONDING HYBRID DRIVE ASSEMBLY

FIELD

The invention relates to a method for operating a hybrid drive assembly for a motor vehicle, which has an internal combustion engine and an electric engine, wherein a separating clutch arranged between the internal combustion engine and the electric engine is set to a target clutch torque by at least partially engaging during an attempt to start the internal combustion engine. The invention also relates to a hybrid drive assembly for a motor vehicle.

BACKGROUND

Publication EP 2 689 157 B1, for example, is known from the prior art. Said publication relates to a safety clutch for a motor vehicle for transmitting a drive torque between an engine shaft, an electric engine and a wheel drive shaft which drives at least one wheel of a vehicle. During problem-free normal operation, a torque transmission between the engine shaft and the wheel drive shaft takes place by means of a releasable positive coupling. In the event of a torque exceeding a threshold, the releasable positive coupling disengages, so that a resilient coupling device takes over the torque transmission, at least for a short time.

SUMMARY

It is the object of the invention to propose a method for operating a hybrid drive assembly for a motor vehicle which has advantages over other methods, in particular avoiding damage to the separating clutch due to a jamming or sluggish internal combustion engine during the attempt to start.

According to the invention, this object is achieved with a method for operating a hybrid drive assembly. In this case provision is made that an actual clutch torque actually transmitted via the separating clutch and a speed of the internal combustion engine are determined during the attempt to start, and if a characteristic value dependent on the actual clutch torque exceeds a threshold value and if an integral of the speed over time continuously falls below a limit value during the attempt to start, the attempt to start is aborted.

The hybrid drive assembly is used to drive the motor vehicle, in this respect therefore to provide a torque directed towards driving the motor vehicle. The hybrid drive assembly has the internal combustion engine and the electric engine. These engines are provided and designed to provide a drive torque supplied by the hybrid drive assembly alone or at least temporarily together. This means that the drive torque is provided only by the internal combustion engine and without using the electric engine, only by the electric engine and without using the internal combustion engine or by the internal combustion engine and the electric engine together.

Provided that there is a sufficient supply of electrical energy, for example if an electrical energy storage device is sufficiently charged, the electric engine can supply the drive torque alone, i.e. without using the internal combustion engine. The internal combustion engine can be switched on in addition in order to provide the driving torque alone or through interaction with the electric engine. For this purpose, the internal combustion engine is started by means of the electric engine.

In order to start the internal combustion engine, the attempt to start is carried out. The attempt to start begins when the hybrid drive assembly receives a request variable that signals the desire to switch on the internal combustion engine. The attempt to start ends either with a successful start of the internal combustion engine or with the attempt to start being aborted.

The attempt to start is to be understood as a process in which an attempt is made to set the internal combustion engine in such a way that it can subsequently provide, or provides at least part of the drive torque. During the attempt to start, the speed of the internal combustion engine, for example from a standstill, should be brought to a speed other than zero, in particular to a speed which corresponds at least to a minimum speed, an idle speed and/or a synchronous speed of the internal combustion engine.

The minimum speed is that speed from which the internal combustion engine can automatically increase its speed further, i.e. without an external drive such as a starter. The idle speed is the speed at which the internal combustion engine is operated when it is not providing any drive torque but is only intended to maintain its speed. The idle speed is preferably selected for quiet and/or low-vibration running of the internal combustion engine. The idle speed is preferably greater than the minimum speed.

The synchronous speed is understood to mean a speed of the internal combustion engine that corresponds to a current speed of the electric engine. In the event of the synchronous speed, there is no slip at the separating clutch, so that the separating clutch can be engaged completely and a rigid connection can be established between the internal combustion engine and the electric engine. The synchronous speed is preferably greater than the minimum speed. It can correspond to the idle speed or be greater than this.

The attempt to start preferably ends in the event of the synchronous speed and when the separating clutch is fully engaged.

During the attempt to start, the separating clutch is at least partially engaged. Here, the separating clutch is set to the target clutch torque. The target clutch torque is used to increase the speed of the internal combustion engine towards the minimum speed and preferably corresponds to a drag torque at which the speed of the internal combustion engine can reach the minimum speed, the idle speed and/or the synchronous speed.

If there is an error or defect in the internal combustion engine, a situation can arise in which the speed of the internal combustion engine does not reach the minimum speed or the minimum speed is only reached for a short time and the speed then falls below the minimum speed.

The error or defect is present in particular in the form of a mechanical defect, for example in the form of a jamming of the output shaft and/or other rotating parts of the internal combustion engine. For example, the malfunction can be caused by insufficient lubrication of the internal combustion engine, which manifests itself in sluggishness of the internal combustion engine or what is known as piston seizure. In any case, this is an error that increases the drag torque required to reach the minimum speed compared to an error-free internal combustion engine or makes it impossible to reach the minimum speed. The attempt to start can therefore not be completed successfully or, if the internal combustion engine reaches the minimum speed for a short time despite the internal combustion engine being faulty, it is completed without successfully starting the internal combustion engine.

As a result, the separating clutch is subjected to the target clutch torque over a longer period of time during the attempt to start, or, if the minimum speed is briefly reached by the speed of the internal combustion engine, it is incorrectly completely engaged. This can result in damage to the separating clutch, for example due to a high thermal and/or mechanical load.

To avoid damaging the separating clutch, the method according to the invention provides for the attempt to start to be aborted. The attempt to start should be aborted if the internal combustion engine does not start successfully and the internal combustion engine therefore being faulty.

Identifying the error or defect of the internal combustion engine is not trivial. In order to identify the faulty internal combustion engine, the method according to the invention therefore provides at least two conditions, at the presence of which the attempt to start is aborted.

The first condition for aborting the attempt to start is met when the characteristic value that is dependent on the actual clutch torque exceeds the threshold value. In this respect, it is checked whether the actual clutch torque actually transmitted by the separating clutch corresponds at least to a torque necessary for starting an error-free internal combustion engine. In other words, a proper function of the separating clutch is determined by the first condition.

Provision could now be made for identifying successful starting of the internal combustion engine as a second condition if the speed of the internal combustion engine reaches or exceeds the minimum speed and/or the idle speed. However, the presence of the faulty internal combustion engine can result in the speed of the internal combustion engine briefly reaching the minimum speed and/or the idle speed during the attempt to start, but then falling below these values again due to the malfunction.

Instead, the invention provides for directing the second condition to the integral of the speed. The second condition for aborting the attempt to start is met if the integral of the speed over time during the attempt to start consistently falls below the limit value. Finally, an error in the internal combustion engine is concluded if the speed of the internal combustion engine does not reach the minimum speed or only briefly exceeds the minimum speed, in particular despite a sufficiently large actual clutch torque. In other words, the second condition is used to determine whether the rotational movement of the internal combustion engine is sufficient to start it.

In order to check the first condition, the method according to the invention provides for the actual clutch torque actually transmitted via the separating clutch to be determined during the attempt to start. The actual clutch torque actually transmitted by the separating clutch can be determined, for example, using a map of the separating clutch, in particular in connection with an actual value of a manipulated variable of the separating clutch, for example a contact pressure. For this purpose, for example, an actual value of the contact pressure can be determined and compared with a target value of the contact pressure determined from the target clutch torque. Additionally or alternatively, the actual clutch torque can be calculated using a model which, for example, takes into account the speeds present on an input side and an output side of the separating clutch, as well as moments of inertia of the corresponding rotating components.

The determined actual clutch torque is available in the form of a course of the actual clutch torque over time. In this respect, a corresponding instantaneous value of the actual clutch torque can be determined at any time during the attempt to start, which corresponds to the actual clutch torque actually transmitted or at least approximates it. The characteristic value is formed from the actual clutch torque or the course of the actual clutch torque over time, and it exceeding the threshold value represents the first condition for aborting the start. The characteristic value is used to identify the functionality of the separating clutch. If the characteristic value, which is dependent on the actual clutch torque, exceeds the threshold value, it is assumed that the separating clutch is functional.

For example, the characteristic value corresponds to the actual clutch torque. However, the characteristic value is preferably a variable determined from the course of the actual clutch torque, which depicts the actual clutch torque transmitted during or immediately after the at least partial engagement or approximately corresponds to it. The characteristic value can be, for example, a maximum value of the actual clutch torque, a difference between two values or a gradient of the actual clutch torque, each within a defined time window.

In order to check the second condition for aborting the attempt to start, the speed of the internal combustion engine is determined in addition to the actual clutch torque actually transmitted. The speed of the internal combustion engine is preferably also available in the form of a course over time. The integral of the speed is determined from the course of the speed over time. In particular, measured values of the speed over time are summed up. According to the method according to the invention, it is not sufficient for a successful start of the internal combustion engine to merely briefly increase the speed to the minimum speed; rather, the speed must be different from zero for a sufficiently long period of time in order to exceed the limit value through the integral of the speed. By taking the integral of the speed into account, the rotational movement of the internal combustion engine is thus reliably identified.

In order to meet both conditions and subsequently abort the attempt to start, on the one hand, the characteristic value which is dependent on the actual clutch torque must exceed the threshold value and, on the other hand, the integral of the speed must consistently fall below the limit value during the attempt to start. Such an approach ensures that the error or the defect in the internal combustion engine is detected during the attempt to start. This reliably prevents damage to the separating clutch.

A refinement of the invention provides that the attempt to start is only aborted if a temperature of the separating clutch additionally exceeds a temperature threshold value. The temperature of the separating clutch is thus used to check a third condition for aborting the attempt to start, which must be met in addition to the first condition and the second condition. It is provided that the attempt to start is aborted if the temperature of the separating clutch exceeds the temperature threshold value. In other words, the attempt to start is continued as long as the temperature of the separating clutch is below the temperature threshold. This aborts the attempt to start before the temperature of the separating clutch can reach a critical value, and damage is avoided.

A refinement of the invention provides that, in order to abort the attempt to start, the separating clutch is disengaged and an error entry is entered in an error memory, the separating clutch then being prevented from engaging as long as the error entry is entered in the error memory. Since the internal combustion engine is started by means of the electric engine, for which purpose the separating clutch is at least partially engaged, the attempt to start is aborted by disengaging the separating clutch, in particular the separating clutch is fully engaged to abort the attempt to start.

At the same time, the error entry is made in the error memory, which is present, for example, in a controller of the internal combustion engine and/or the hybrid drive assembly. After the attempt to start is aborted, it is assumed that there is a faulty internal combustion engine. Therefore, the engaging of the separating clutch is subsequently prevented as long as the error entry is entered in the error memory. This prevents repeated engaging of the separating clutch and the associated potential damage to the separating clutch. Instead of entering the error entry, an error status can be recorded. In this case, the error status is marked as active when the attempt to start is aborted. Thus, after aborting the attempt to start, an error status marked as active is present. While there is the active error status, the internal combustion engine is not available to provide the drive torque. The active error status can be associated with taking appropriate countermeasures that enable reliable operation of the hybrid drive assembly without using the internal combustion engine.

A refinement of the invention provides that the error entry is deleted from the error memory after a specific period of time has elapsed after the attempt to start was aborted. As already explained above, the engaging of the separating clutch and thus a renewed attempt to start the internal combustion engine are prevented as long as the error entry is entered in the error memory. A new attempt to start is only possible after the error entry has been deleted from the error memory.

Provision is now made to delete the error entry after the specified period of time has elapsed after the attempt to start was aborted. This means that the engaging of the separating clutch is not permanently prevented after the attempt to start has been aborted, but only for a specific period of time. The length of the specific period of time can be linked to other conditions, for example to the hybrid drive assembly being switched off in the meantime. This prevents a new attempt to start from being impossible after the attempt to start has been aborted and the specific period of time has elapsed. If the error status was retained when the attempt to start was aborted, it is marked as passive after the specified period of time has elapsed. The countermeasures mentioned above are no longer carried out while the passive error status is present, so that reliable operation of the hybrid drive assembly using the internal combustion engine is made possible.

A refinement of the invention provides that the error entry is deleted from the error memory only if the temperature of the separating clutch falls below the temperature threshold value over the specific period of time. As explained above, it can be provided that the attempt to start is only aborted when the temperature of the separating clutch additionally exceeds the temperature threshold value. Accordingly, the error entry is only deleted from the error memory if the temperature of the separating clutch falls below the temperature threshold. If, when the attempt to start was aborted, the error status has been retained, it is marked as passive, as explained above.

This ensures that a new attempt to start is prevented as long as the temperature of the separating clutch is above the temperature threshold value. In other words, after the attempt to start is aborted, a new attempt to start is prevented as long as the temperature of the separating clutch is in a critical temperature range and damage to the separating clutch due to the faulty internal combustion engine is therefore more likely.

A refinement of the invention provides that a maximum value of the actual clutch torque occurring after the at least partial engagement of the separating clutch is used as a characteristic value. As already explained above, the characteristic value represents a variable that is dependent on the actual clutch torque. Provision is made to use the maximum value of the actual clutch torque as a characteristic value, which occurs within a time window that begins with the partial engagement of the separating clutch and ends at a predetermined point in time after the partial engagement of the separating clutch. In other words, the maximum value of the actual clutch torque that occurs during the entire attempt to start is not used as the characteristic value, but only the maximum value of the actual clutch torque that occurs within the predefined time window. Since the characteristic value is used to check the proper functioning of the separating clutch, it is advantageous to carry out this check within the time window. Alternatively, a gradient of the actual clutch torque occurring within the time window can be used as a characteristic value. This approach enables a check to be made as to whether the separating clutch has a sufficiently fast reaction speed for it to function properly.

A refinement of the invention provides that a difference between the maximum value and a minimum value of the actual clutch torque occurring before the partial engagement of the separating clutch is used as the characteristic value. Since the determination of the actual clutch torque can be subject to absolute and relative errors, the invention provides for determining the minimum value in addition to the maximum value and using a difference between these values as the characteristic value. In this way, when determining the actually transmitted actual clutch torque, errors are compensated for and the reliability of the determination of the characteristic value is improved.

A refinement of the invention provides that the target clutch torque is set to a first value during engagement and is increased towards a second value during the attempt to start until the speed of the internal combustion engine has reached a minimum speed. During the attempt to start, the target clutch torque is initially set to a first value, in particular to a predetermined first value. The target clutch torque is then increased until the separating clutch is fully engaged and there is a rigid connection between the internal combustion engine and the electric engine, provided the attempt to start is not aborted due to the conditions explained above.

In other words, the target clutch torque is increased towards the second value as long as the speed of the internal combustion engine does not reach the minimum speed and the attempt to start is not aborted. The increase can be continuous or in discrete steps. This ensures that there is sufficient actual clutch torque to start the internal combustion engine and that if the internal combustion engine is free of error, it starts reliably.

A refinement of the method provides that the target clutch torque is increased in specific target clutch torque steps, with the attempt to start being aborted if the second value is reached or exceeded by the target clutch torque. The second value of the target clutch torque is, in particular, a maximum target clutch torque that can be transmitted by the separating clutch.

Thus, the target clutch torque is not increased continuously but stepwise. In particular, the attempt to start is aborted when the target clutch torque reaches the second value without the speed of the internal combustion engine reaching the minimum speed. This ensures that on the one hand an attempt is made to successfully start the internal combustion engine by increasing the target clutch torque, and on the other hand damage to the separating clutch is avoided since the attempt to start is aborted before the maximum target clutch torque that can be transmitted by the separating clutch is exceeded.

The invention also relates to a hybrid drive assembly for a motor vehicle, in particular for carrying out the method according to the statements made within the scope of this description, the hybrid drive assembly having an internal combustion engine and an electric engine and being designed to set a separating clutch arranged in drive terms between the internal combustion engine and the electric engine to a target clutch torque by at least partially engaging it during an attempt to start the internal combustion engine. In this case, it is provided that the hybrid drive assembly is further designed to determine an actual clutch torque actually transmitted via the separating clutch and a speed of the internal combustion engine during the attempt to start the internal combustion engine, wherein, if a characteristic value dependent on the actual clutch torque exceeds a threshold value and if an integral of the speed over time continuously falls below a limit value during the attempt to start, the attempt to start is aborted.

Reference has already been made to the advantages of such a configuration of the hybrid drive assembly and such an approach. Both the hybrid drive assembly and the method for its operation can be refined according to the explanations within the scope of this description, so that reference is made to them in this respect.

BRIEF DESCRIPTION OF THE FIGURE(S)

The invention is explained in more detail below with reference to the exemplary embodiments illustrated in the drawing, without limiting the invention.

The FIGURE shows a schematic representation of a hybrid drive assembly for carrying out the method according to this description.

DETAILED DESCRIPTION

The FIGURE shows a hybrid drive assembly 1 for a motor vehicle, which has an internal combustion engine 2 and an electric engine 3. A separating clutch 4 is arranged in drive terms between the internal combustion engine 2 and the electric engine 3 and is present, for example, as a multi-plate clutch. The hybrid drive assembly 1 at least temporarily provides a drive torque for driving the motor vehicle. The drive torque is provided by the internal combustion engine 2 and the electric engine 3 alone or at least temporarily together in a hybrid operation.

Internal combustion engine 2 is switched off or stopped at least temporarily during hybrid operation of hybrid drive assembly 1. In particular, provision is made for the internal combustion engine 2 to be started when a corresponding request variable is present and for at least part of the drive torque to be generated by means of the internal combustion engine 2.

In order to start the internal combustion engine 2, an attempt to start is carried out. The attempt to start begins when the request variable is present or when the separating clutch 4 is at least partially engaged to start the internal combustion engine 2 and ends either with a successful start of the internal combustion engine 2 or with the attempt to start being aborted. In the event of a successful start, the internal combustion engine 2 is then able to provide the drive torque at least partially independently.

When the internal combustion engine 2 starts successfully, it reaches a minimum speed, an idle speed or a synchronous speed. The synchronous speed is understood to mean a speed of the internal combustion engine that corresponds to a speed of the electric engine 3 that is present at the moment. When the synchronous speed is present, there is no slip at the separating clutch 4, so that the separating clutch 4 is completely engaged and a rigid connection can be established between the internal combustion engine 2 and the electric engine 3.

During the attempt to start, the speed of the internal combustion engine 2 is increased from standstill towards the minimum speed. At the beginning of the attempt to start, the internal combustion engine 2 is preferably at a standstill or has a speed that is less than the minimum speed.

During the attempt to start, the separating clutch 4 is at least partially engaged. Here, the separating clutch 4 is set to a target clutch torque. The target clutch torque is used to increase the speed of the internal combustion engine 2 towards the minimum speed and preferably corresponds to a predetermined drag torque, when the speed of the internal combustion engine 2 can reach the minimum speed.

The target clutch torque is increased by further engaging the separating clutch 4, starting from a first value towards a second value. The target clutch torque is increased until the speed of internal combustion engine 2 has reached a minimum speed or the attempt to start is aborted. In particular, it can be provided that the target clutch torque is stepwise increased in specific target clutch torque increments. In particular, said increasing takes place periodically, for example at fixed time intervals.

During the attempt to start, the actual clutch torque actually transmitted via the separating clutch 4 is determined. The actual clutch torque is determined, for example, from a characteristic map of the separating clutch 4 or alternatively calculated from a speed gradient and/or a mass moment of inertia. A time course of the actual clutch torque can be formed on the basis of the determined actual clutch torque. From the course of the actual clutch torque over time, a characteristic value is determined which corresponds to a maximum value of the actual clutch torque occurring after the at least partial engagement of the separating clutch 4.

A maximum value of the actual clutch torque occurring within a specific time window after the engagement of the separating clutch 4 is preferably used as the characteristic value and not a maximum value occurring over the entire attempt to start. Alternatively, a difference between the maximum value, in particular the maximum value occurring within the time window, and a minimum value of the actual clutch torque occurring before the at least partial engagement of the separating clutch 4 is used as a characteristic value.

In addition, a course of the speed of the internal combustion engine 2 over time is determined. An integral over time is determined from the course of the speed of the internal combustion engine 2 over time. In particular, measured values of the speed over time are summed up for this purpose.

Provision is made to abort the attempt to start if the characteristic value exceeds a threshold value and the integral of the speed continuously falls below a limit value during the attempt to start. In addition, provision can be made that the attempt to start is only aborted if also a temperature of the separating clutch 4 exceeds a temperature threshold value. For example, the threshold is set to correspond to a torque or a characteristic value at which the engine 2 can normally be started.

To abort the attempt to start, the separating clutch 4 is disengaged and an error entry is made in an error memory. Engagement of the separating clutch 4 is then prevented as long as the error entry is entered in the error memory. The error entry is deleted from the error memory after a specific period of time has elapsed after the attempt to start was aborted, and/or when the temperature of the separating clutch 4 falls below the temperature threshold value over the specific period of time.

The method according to the invention avoids damage or destruction of the separating clutch 4 if the internal combustion engine 2 is sluggish or jammed.

LIST OF REFERENCE NUMERALS

1 hybrid drive assembly
2 internal combustion engine
3 electric engine
4 disconnect clutch

The invention claimed is:

1. A method for operating a hybrid drive assembly for a motor vehicle, comprising: an internal combustion engine and an electric engine, wherein a separating clutch arranged between the internal combustion engine and the electric engine is set to a target clutch torque by at least partially engaging it during an attempt to start the internal combustion engine, wherein an actual clutch torque actually transmitted via the separating clutch and a speed of the internal combustion engine are determined during the attempt to start, and if a characteristic value dependent on the actual clutch torque exceeds a threshold value and if an integral of the speed over time continuously falls below a limit value during the attempt to start, the attempt to start is aborted.

2. The method according to claim 1, wherein the attempt to start is only aborted if a temperature threshold value is additionally exceeded by a temperature of the separating clutch.

3. The method according to claim 1, wherein to abort the attempt to start the separating clutch is disengaged and an error entry is entered in the error memory, wherein subsequently an engagement of the separating clutch is prevented, as long as the error entry is entered in the error memory.

4. The method according to claim 3, wherein the error entry is deleted from the error memory after a specific period of time has elapsed after the attempt to start was aborted.

5. The method according to claim 3, wherein the error entry is deleted from the error memory only if the temperature of the separating clutch falls below the threshold value over the specific period of time.

6. The method according to claim 1, wherein a maximum value of the actual clutch torque occurring after the at least partial engagement of the separating clutch is used as the characteristic value.

7. The method according to claim 6, wherein a difference between the maximum value and a minimum value of the actual clutch torque occurring before the partial engagement of the separating clutch is used as the characteristic value.

8. The method according to claim 1, wherein the target clutch torque is set to a first value when engaging and increased in the direction of a second value during the attempt to start until the speed of the internal combustion engine has reached a minimum speed.

9. The method according to claim 8, wherein the target clutch torque is increased in specific target clutch torque increments, with the attempt to start being aborted if the second value is reached or exceeded by the target clutch torque.

10. A hybrid drive assembly for a motor vehicle for carrying out the method according claim 1.

11. The method according to claim 2, wherein to abort the attempt to start the separating clutch is disengaged and an error entry is entered in the error memory, wherein subsequently an engagement of the separating clutch is prevented, as long as the error entry is entered in the error memory.

12. The method according to claim 2, wherein the attempt to start is only aborted if a temperature threshold value is additionally exceeded by a temperature of the separating clutch.

13. The method according to claim 5, wherein the attempt to start is only aborted if a temperature threshold value is additionally exceeded by a temperature of the separating clutch.

14. The method according to claim 4, wherein the error entry is deleted from the error memory only if the temperature of the separating clutch falls below the threshold value over the specific period of time.

15. The method according to claim 2, wherein a maximum value of the actual clutch torque occurring after the at least partial engagement of the separating clutch is used as the characteristic value.

16. The method according to claim 3, wherein a maximum value of the actual clutch torque occurring after the at least partial engagement of the separating clutch is used as the characteristic value.

17. The method according to claim 4, wherein a maximum value of the actual clutch torque occurring after the at least partial engagement of the separating clutch is used as the characteristic value.

18. The method according to claim 5, wherein a maximum value of the actual clutch torque occurring after the at least partial engagement of the separating clutch is used as the characteristic value.

* * * * *